Sept. 3, 1946.    N. TITLESTAD    2,406,930
SULFURIC ACID REGENERATION
Filed June 12, 1942    5 Sheets-Sheet 1

INVENTOR
NICOLAY TITLESTAD,
BY
*Wm. P. Spielman*
ATTORNEY

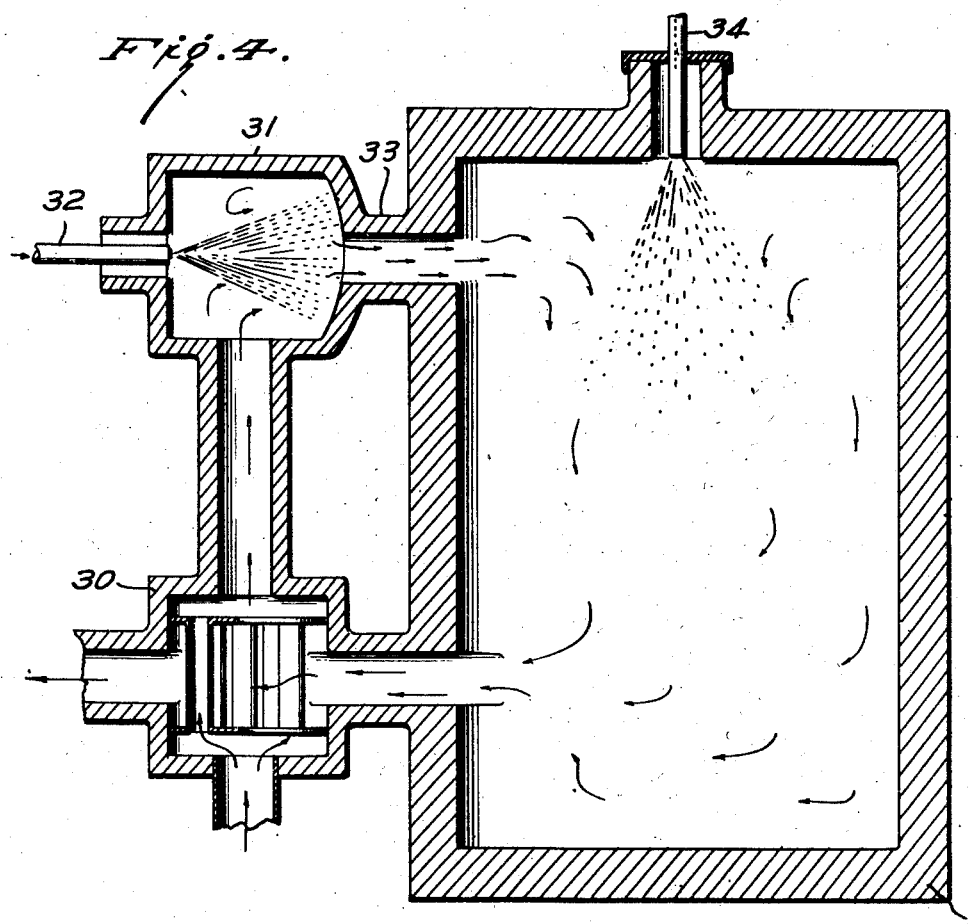
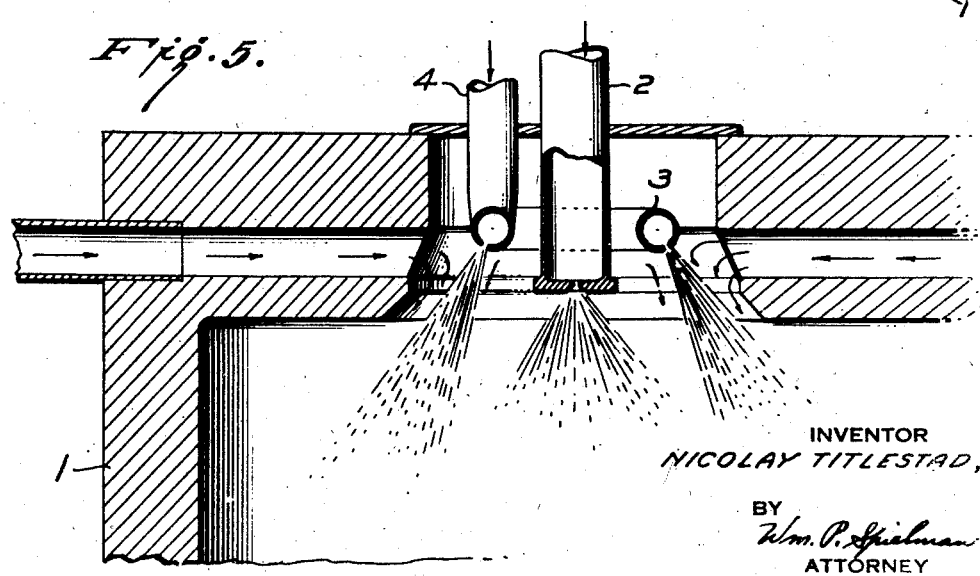

Sept. 3, 1946.  N. TITLESTAD  2,406,930
SULFURIC ACID REGENERATION
Filed June 12, 1942  5 Sheets-Sheet 4

INVENTOR
NICOLAY TITLESTAD
BY
Wm. P. Spielman
ATTORNEY

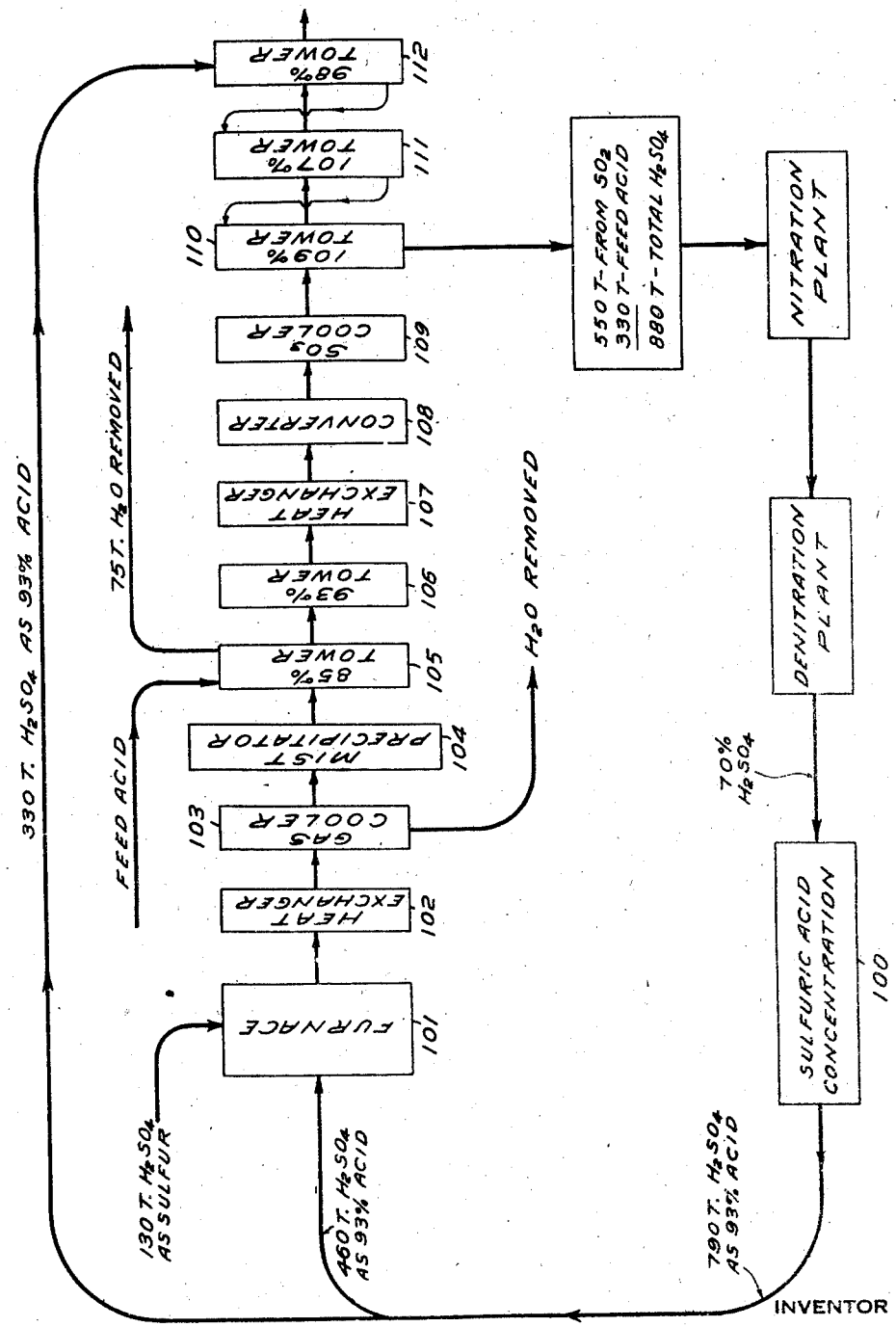

Patented Sept. 3, 1946

2,406,930

UNITED STATES PATENT OFFICE 2,406,930

SULPHURIC ACID REGENERATION

Nicolay Titlestad, White Plains, N. Y., assignor to Chemical Construction Corporation, New York, N. Y., a corporation of Delaware Application June 12, 1942, Serial No. 446,719

6 Claims. (Cl. 23—172)

This invention relates to a regeneration method for the production of sulphuric acid monohydrate or oleum from waste or by-product acid of 80–96% H₂SO₄ content or less. The process is especially well adapted for the production of oleum suitable for use in the nitration of toluol, phenols and the like for the manufacture of explosives, using as a principal raw material the denitrated sulphuric acid obtained as a by-product therefrom. It should be understood, however, that partially diluted and contaminated sulphuric acid from other sources may be regenerated into sulphuric acid monohydrate or oleum by the process of the invention, typical examples being spent alkylation acid from the production of high octane gasoline by condensing isobutane and butylene in strong sulphuric acid, spent acid from the absortion of olenfines in the manufacture of isopropyl and isobutyl alcohols and the like.

It is well known to reconcentrate sulphuric acid obtained from the above and similar sources by ordinary concentrating methods, such as by heating in acid proof vessels, by the direct action of hot gases, or by combinations of these two methods. However, such concentration methods can only be used to obtain 93–96% sulphuric acid at the most since it is not feasible to produce stronger acid by ordinary methods of concentration. This reconcentrated acid must be fortified by SO₃ from other sources in order to produce 98% sulphuric acid or oleum.

The reconcentration of spent sulphuric acid from nitrating mixtures by ordinary methods followed by fortification with sulphur trioxide always results in the production of a large amount of excess sulphuric acid of 80–96% H₂SO₄ content, which acid is usually dark or discolored, of little or no commercial value, and hard to dispose of. It is a principal object of the present invention to provide a method of regenerating strong sulphuric acid of 80–96% H₂SO₄ content into monohydrate or oleum of any desired strength by a process which completely avoids the production of such waste acid. A further important object is the provision of a regeneration process wherein the water balance can be controlled at any desired value, thereby enabling the operator to produce any desired proportion of oleum of varying strengths, together with sulphuric acid monohydrate if desired, independently of atmospheric conditions prevailing in the plant.

The underlying principle of the present invention is the decomposition of sulphuric acid into sulphur dioxide, oxygen and water vapor by the reaction.

$$2H_2SO_4 \rightarrow 2SO_2 + O_2 + 2H_2O$$

It is known to decompose sulphuric acid into an equimolecular mixture of sulphur dioxide, carbon dioxide and water vapor by the use of reducing agents, and this decomposition has been suggested for the disposal of relatively weak sulphuric acid. However the large amount of carbon dioxide, together with the nitrogen present in the secondary air that must be added, makes the resulting sulphur dioxide gases too dilute for economical recovery by the contact sulphuric acid process.

As distinguished from these reduction processes, the present invention is directed to the decomposition of strong sulphuric acid of 80–96% H₂SO₄ content by heating the acid in finely divided form to extremely high temperatures, whereby the H₂SO₄ is decomposed rapidly to sulphur dioxide, oxygen and water vapor without the necessity of employing reducing agents. I have discovered that sulphuric acid of this strength can be completely decomposed to a mixture of sulphur dioxide, oxygen and water vapor having a high content of sulphur dioxide and oxygen by direct contact of the strong sulphurc acid in finely divided form with the flame of a burning mixture of a combustible hydrocarbon and air preheated to at least 800° F.

The use of preheated air is a very important feature of my invention, for the added heat supplied in this manner augments the normal flame temperature so that the finely divided acid is decomposed at temperatures of 1600–2400° F. or higher. The acid is then rapidly and completely decomposed into a gas mixture containing practically no SO₃ or undecomposed sulphuric acid but containing sulphur dioxide and oxygen in the proper ratio for treatment in a contact sulphuric acid plant. Moreover, the preheat supplied to the air reduces the quantity of fuel that would otherwise be necessary for complete decomposition, and dilution of the furnace gases with carbon dioxide is correspondingly reduced. Thus, for example, by burning sulphuric acid of 90–93% H₂SO₄ content in this manner with air preheated to 1600–1700° F., a gas mixture is obtained which contains 8–8.5% SO₂ and 11–11.5% oxygen by volume.

In order to heat all the sulphuric acid rapidly to the extremely high decomposing temperatures that are necessary to obtain a SO₂ gas substantially free from SO₃ it is necessary to introduce the sulphuric acid in the form of a vapor or a finely divided spray which will result in immediate vaporization of the acid upon contact with the flame of the burning hydrocarbon. In one embodiment of this feature of my invention I inject a stream of the finely divided strong sulphuric acid into a cone of flame formed by a burning mixture of combustible hydrocarbon and preheated air. This procedure insures complete vaporization of the acid before it can contact with the refractory lining of the furnace, and thus prevents deterioration of the furnace wall.

Another specific embodiment of my invention includes a preliminary vaporization of the strong sulphuric acid by preheated air, preferably by injecting the acid in finely divided form into the air stream, after which the resulting sulphuric acid vapors are commingled with the flame of the burning hydrocarbon. This preliminary vaporization produces a molecular dispersion of the sulphuric acid and facilitates complete decomposition thereof in the furnace. The preliminary vaporization also assists in maintaining a high flame temperature since the heat necessary to supply the latent heat of vaporization of the acid is not suddenly abstracted from the burning hydrocarbon, but is supplied by the preheated air.

Another method that can be employed to insure a high flame temperature is to introduce a hydrocarbon fuel in admixture with the sulphuric acid. This occurs naturally in the treatment of alkylation acid and denitrated acid from the nitration of aromatic hydrocarbons and phenols wherein the concentrated acid contains substantial quantities of hydrocarbons or other combustible material, and the combustion of this material in the furnace permits a corresponding reduction in the amount of additional fuel that must be supplied.

Upon completion of the sulphuric acid decomposition the resulting gas mixture, which contains sulphur dioxide, oxygen, water vapor and carbon dioxide, is preferably cooled by contacting it with a spray of cooling water, with or without preliminary cooling. The water spray serves to condense excess water from the gases, which may then be passed through an electrostatic precipitator of the Cottrell type or through coke boxes to remove any acid mist that may be present. The gases are then further dried by contact with strong sulphuric acid after which they are preheated to conversion temperatures of 400–500° C. and passed through a catalytic converter containing a sulphuric acid contact mass of the platinum or vanadium oxide type in order to convert their $SO_2$ content to $SO_3$.

The gases from the converter, in which substantially all the sulphur dioxide has been oxidized to sulphur trioxide, are preferably cooled to temperatures of about 200–250° C. or lower in a sulphur trioxide cooler and are then absorbed in strong sulphuric acid in the usual manner to form sulphuric acid monohydrate or oleum. For this purpose two or more absorbers operating in series may be used wherein the rate of feed of the absorbing acid may be adjusted to produce oleum of different strengths. In such cases the gases leaving the last oleum absorber are preferably passed through a final absorbing tower where part of the spent acid which has been concentrated by ordinary methods to 93–96% $H_2SO_4$ content is added.

The process of my invention will be further described with reference to the accompanying drawings, which illustrate certain preferred modifications thereof. In these drawings:

Fig. 4 illustrates diagrammatically a further modification wherein the sulphuric acid is vaporized into a stream of preheated air before being admitted into the furnace proper;

Fig. 5 illustrates an embodiment wherein the incoming air is preheated by passage through the furnace walls;

Fig. 8 is a flow sheet showing a method of applying the invention in a nitrating plant.

Figure 1:
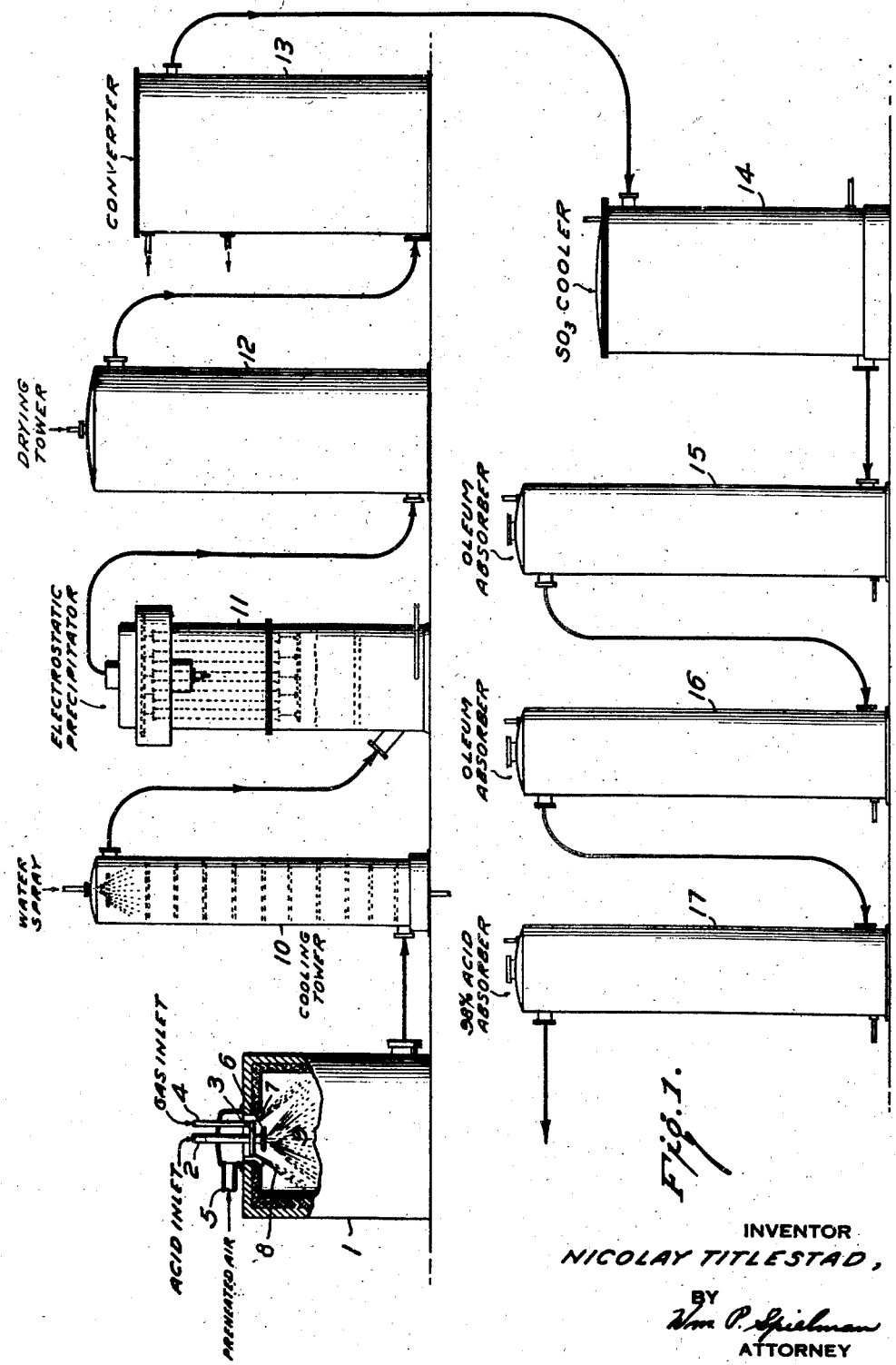
Fig. 1 is a flow diagram wherein the most essential steps of the complete process of oleum production are diagrammatically illustrated.

Referring to Fig. 1, strong sulphuric acid of 80–96% $H_2SO_4$ content is subjected to thermal decomposition in a furnace 1 in accordance with the principles of my invention as outlined above. The acid is preferably injected in the form of a finely divided spray through an acid inlet pipe 2, and this spray is surrounded by a cone of flame formed by burning in the burner 3 a combustible hydrocarbon gas introduced through the pipe 4. Flame temperatures of 1600–2400° F. are insured by the introduction of preheated air through the air inlet 5, the air preferably being preheated to a temperature of within 200–800° F. of the combustion temperature necessary to obtain complete decomposition of sulphuric acid of the strength being used. A minimum preheating temperature of 800° F. is necessary, and a preferred temperature range of 1400–1800° F. is usually employed for this purpose.

Figure 3:
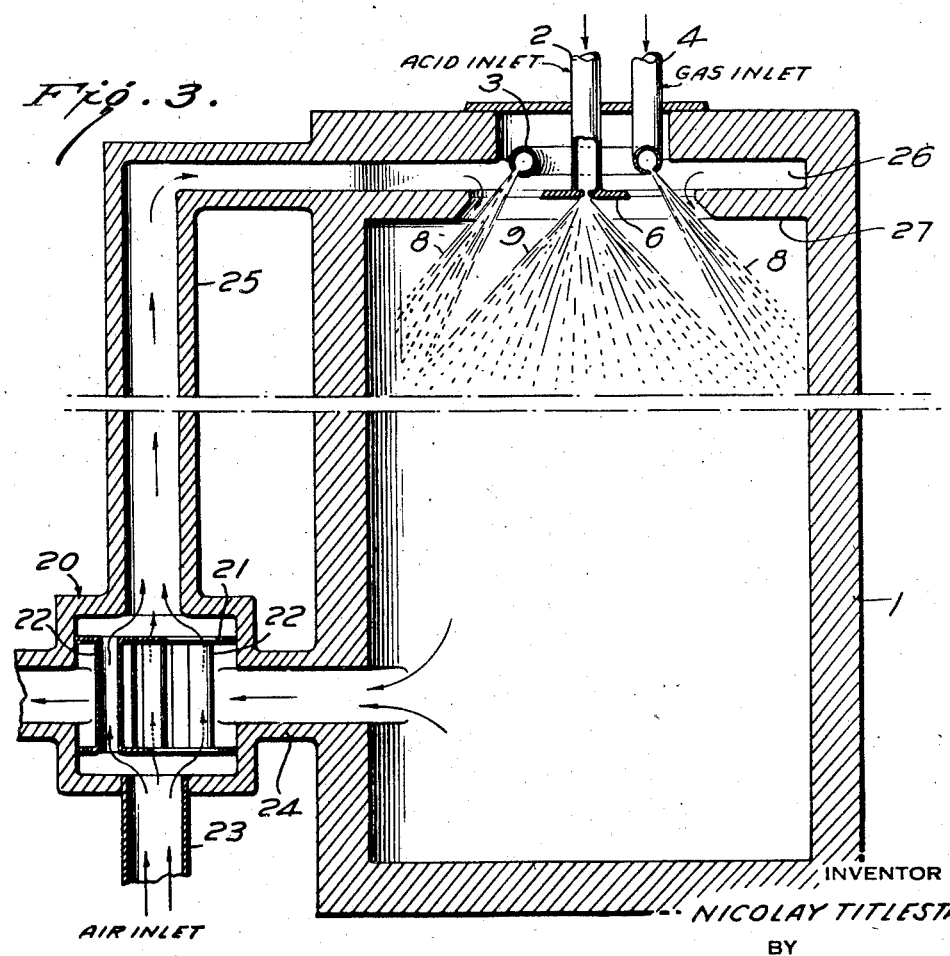
Fig. 3 is a diagrammatic illustration of a modified form of furnace wherein the air is preheated by heat exchange with the furnace gases.

The gases from the furnace 1 may be given a preliminary cooling by heat exchange with the incoming air, as shown in greater detail in Figs. 3 and 4, or a part of their heat content may be recovered by other means. The furnace gases are then cooled to relatively low temperatures on the order of 70–90° F. or lower by direct contact with a spray of cooling water in the cooling tower 10, which results in condensing the greater part of their moisture content. The cooled and partially dehydrated gases are then preferably subjected to the action of an electrostatic field in a precipitator 11 for the removal of acid mist, after which the remainder of their moisture is removed by contacting them with strong sulphuric acid in the drying tower 12.

The resulting dried gas mixture, containing carbon dioxide and sulphur dioxide and oxygen in proportions suitable for catalytic conversion, is preheated and converted into sulphur trioxide gases in a catalytic converter 13 of any suitable design. The resulting converted gases are the passed through a sulphur trioxide cooler 14 and are introduced successively into the absorption towers 15 and 16 where the $SO_3$ is taken up in strong sulphuric acid for the production of oleum. The gases are then passed through a final absorbing tower 17 which may be fed with reconcentrated spent sulphuric acid of 93–96% or with acid from the drying tower 12, wherein the remainder of their sulphur trioxide content may be removed.

As has been stated, it is necessary to obtain a rapid and complete decomposition of the sulphuric acid in the furnace 1 in order to prevent excessive loss of sulphur values as sulphur trioxide or distilled sulphuric acid in the cooling tower 10 and precipitator 11. One of the most important features of my invention resides in the commingling of a strong sulphuric acid of 80–96% $H_2SO_4$ content in finely divided form with the flame of a burning mixture of a combustible hydrocarbon and preheated air, for I have found that this treatment results in an extremely rapid and complete decomposition of the $H_2SO_4$ to sulphur dioxide, oxygen and water vapor. In the arrangement shown in Fig. 2 this is accomplished by spraying the strong sulphuric acid from the pipe 2 through an atomizing nozzle 6, this nozzle being mounted just below the center of the ring type burner 3 wherein a hydrocarbon gas is burned with the aid of preheated air entering through the air conduit 5. This air is supplied through vanes 7 and mixes with the hydrocarbon gas from the pipe 4 to form a cone of flame within the furnace. The acid spray 9 from the spray nozzle 6 commingles with the flame 8 and is almost instantly vaporized and decomposed under the action of the high flame temperature resulting from the use of preheated air.

Figure 2:
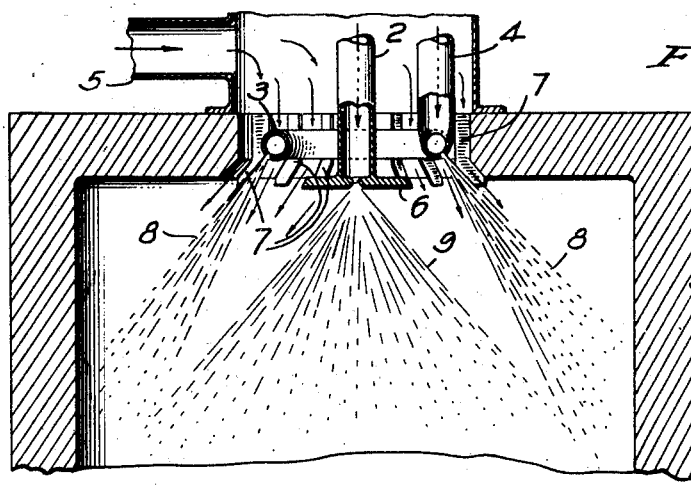
Fig. 2 is an enlarged diagrammatic illustration of the upper part of the furnace shown in Fig. 1.

In the modification of Fig. 3 the acid injecting nozzle and gas burner are identical with those shown in Fig. 2, but a particularly advantageous method of preheating the incoming air is illustrated. In this modification of the invention an air preheater 20 is provided in the form of a tubular heat exchanger 21 provided with heat exchange tubes 22 mounted across the conduit 23 for the incoming air. Acid gases from the furnace 1 are conducted through flue 24 into the space surrounding the tubes 22 and serve to preheat the incoming air passing through these tubes. The preheated air is then conducted through pipe 25 into a channel 26 between a portion of the lining 27 and the outer wall of the furnace 1, wherein it is further preheated before admixture with gas from the burner 3.

Fig. 4 illustrates a further modification of the sulphuric acid decomposition process of my invention wherein a spearate chamber is provided for vaporizing the strong sulphuric acid into a stream of preheated air before it is commingled with the decomposing flame. In practicing this modification of the invention the air is preferably preheated by a preheater 30 which is identical with the heat exchanger 20 shown in Fig. 3 and the resulting preheated air, having a temperature of at least 800° F. is then admitted to a vaporizing chamber 31 where it is contacted with a spray of strong sulphuric acid of 80–96% $H_2SO_4$ content admitted through acid inlet pipe 32. The acid is rapidly vaporized into the air by reason of the high temperature thereof, which is well above the boiling point of the acid, and the resulting vapors are admitted through inlet pipe 33 to the furnace where they are commingled with a flame of burning hydrocarbon which is admitted through inlet pipe 34. In practicing this modification of the invention the temperature of the sulphuric acid-preheated air mixture entering the furnace through the pipe 33 is usually lower than in the modification of Figs. 2 and 3, for a part of the preheat has been used in vaporizing the sulphuric acid. However, the heat content of the incoming air-sulphuric acid mixture is of course the same as that of the preheated air in the other modifications shown, and the same high flame temperature is therefore obtained in the decomposition furnace.

Figure 6:
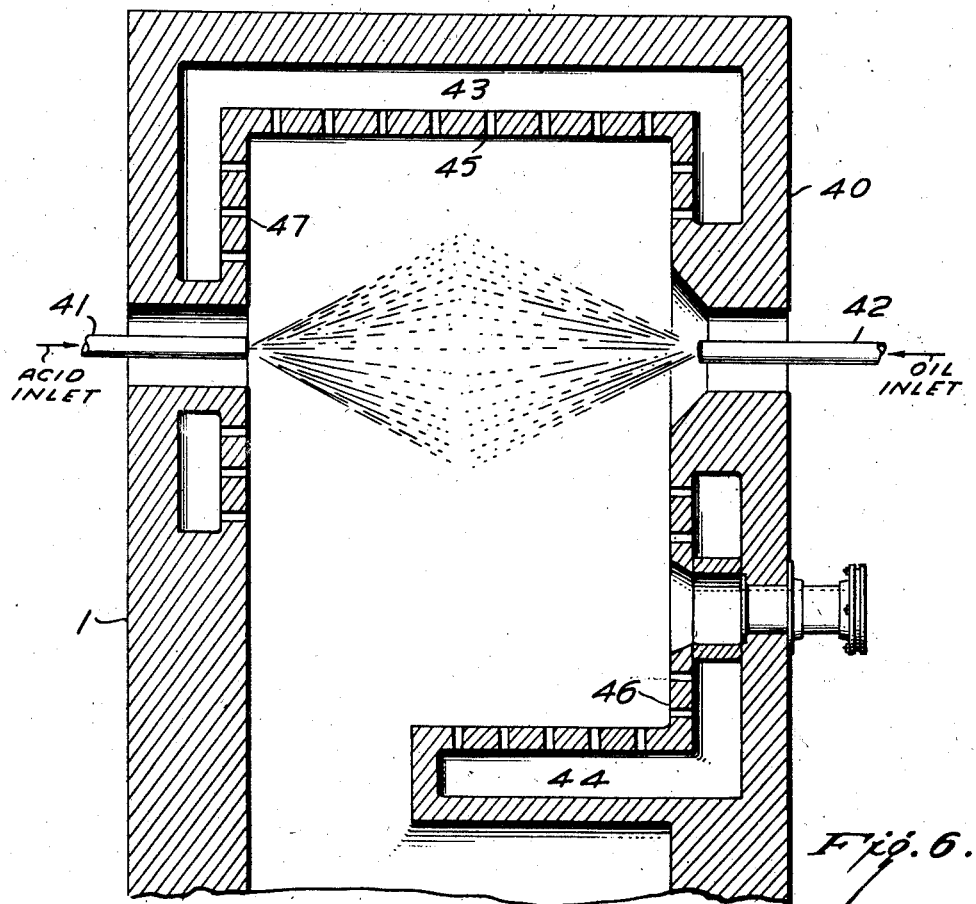
Fig. 6 is a modification showing another method of preheating the air while protecting the furnace walls from damage by the high furnace temperature.

In the modification of Fig. 6 opposed jets of finely divided strong sulphuric acid and hydrocarbon oil are injected from opposite sides of a furnace 40 through pipes 41 and 42 respectively. Preheated air at a temperature sufficiently high to maintain the necessary high decomposition temperatures of 1600–2400° F. is introduced from passages 43 and 44 in the walls of the furnace through perforations 45 and 46 in the refractory brink lining 47 thereof. By introducing the air in this manner the furnace lining 47 is protected against destruction by possible localized high furnace temperatures, while the air during its flow through the passages 43 and 44 may be given the necessary degree of preheat to insure a suitably high flame temperature in the furnace.

Figure 7:
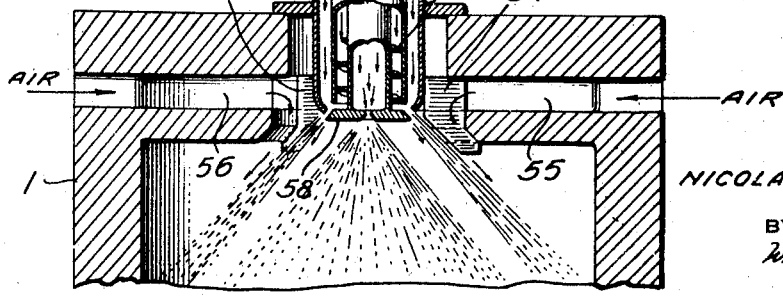
Fig. 7 is a modification of the embodiment of Fig. 5 showing a method of injecting a vaporizable liquid hydrocarbon into the furnace by the action of steam.

When a liquid hydrocarbon is used as a fuel a modified spray nozzle of the type illustrated in Fig. 7 may be employed, and it should be understood that an injector of this type may be substituted in the furnaces shown in Figs. 2, 3 and 5 if desired. Referring to Fig. 7 of the drawings the injector, which is designated generally by reference numeral 50, comprises three concentric pipes: an inner pipe 51, an intermediate pipe 52 and an outer pipe 53 adapted to conduct strong sulphuric acid, fuel oil and steam respectively. A spiral 54 near the outlet of pipe 52 is adapted to impart a swirling motion to the fuel oil as it is ejected therefrom, and a blast of steam from the outer pipe 53 immediately atomizes the rotating stream of oil and injects it into the furnace 1 in the form of a fine spray. Preheated air entering through the passages 55 and 56 is mixed with this oil spray by the action of directing vanes 57, and the ignited oil spray forms a cone of flame with which finely divided acid from the spray nozzle 58 is mixed.

From the foregoing it is evident that the sulphuric acid decomposition process of my invention is essentially one wherein strong sulphuric acid of about 80–96% $H_2SO_4$ content is heated to temperatures of at least 1600° F., and preferably at temperatures within the range of 1600–2400° F. by commingling it in finely divided form with the flame of a burning mixture of a combustible hydrocarbon and air preheated to at least 800° F., the temperature at which the air is preheated preferably being within 200–800° F. of the desired flame temperature. The heating is continued at these temperatures for a time sufficient to complete the reaction $$2H_2SO_4 \rightarrow 2SO_2 + O_2 + 2H_2O$$

while complete decomposition of the sulphuric acid and avoidance of $SO_3$ formation is obtained by the extremely high flame temperature resulting from the use of air preheated to the extent indicated. When the sulphuric acid has been decomposed by this process the water can be removed from the resulting gas mixture by cooling or by any other suitable means, after which the sulphur dioxide content of the gases is oxidized to sulphur trioxide which is absorbed in concentrated sulphuric acid for the formation of sulphuric acid monohydrate or oleum.

As a specific example illustrating the practice of my invention, 106 tons of $H_2SO_4$ (as 93% sulphuric acid) are sprayed during a 24-hour day into a combustion furnace provided with sufficient fuel oil (3700 gallons of fuel oil of .902 sp. gr.) and sufficient air (3400 cu. ft. min. at standard conditions) to supply the required heat to completely decompose the sulphuric acid. I have found that this reaction goes substantially to completion at temperatures within the range of 1600–2400° F. provided that more than 6% of oxygen on the dry basis is present in the reaction products. Under these conditions if the sulphuric acid entering the furnace has a temperature of 150° F. and the entering air is preheated to 1750° F. the flame temperature within the furnace will be about 2200° F. and there will be obtained 5200 cu. ft. per min. (measured under standard conditions) of gases leaving the furnace with the following composition

|  | Dry | Wet |
| --- | --- | --- |
| $SO_2$ | 13.4 | 10.3 |
| $CO_2$ | 12.4 | 9.6 |
| $N_2$ | 67.6 | 52.0 |
| $O_2$ | 6.7 | 5.2 |
| $H_2O$ |  | 23.0 |
|  | 100.1 | 100.1 |

These gases are cooled to approximately 75° F. by direct contact with cooling water at 70° F. in the cooling tower 10. The resulting gases, after passing through the electrostatic precipitator 11, drying tower 12, catalytic converter 13 and $SO_3$ cooler 14 are absorbed in strong sulphuric acid in the towers 15, 16 and 17.

A complete process for the regeneration of spent denitrated sulphuric acid in conjunction with the operation of a nitration plant is illustrated in Fig. 8 of the drawings, which is a flow sheet illustrating diagrammatically the various steps of the process. In this plant the concentrators 100 are fed with spent denitrated acid of about 70% $H_2SO_4$ content and supply 790 tons of real $H_2SO_4$ per 24 hour day as 93% sulphuric acid. 495 tons of this 93% acid (corresponding to 460 tons $H_2SO_4$) are sprayed into the furnace 101 together with sufficient sulphur or sulphur-bearing material to produce 130 tons of $H_2SO_4$ as make-up acid. Thus, for example, 42.5 tons of sulphur may be burned in the furnace 101 per 24 hour day. Alternatively, the sulphur may be burned in a separate sulphur burner and the heat may be recovered in the heat exchanger 102 wherein the hot gases from the furnace 101 and from the sulphur burner may be mixed and passed in heat exchange relation with the incoming air in order to preheat the air to the requisite degree. The resulting sulphur dioxide gas mixture is then cooled to precipitate excessive moisture in the gas cooler 103 and passed through the mist precipitator 104 and drying towers 105 and 106, after which it is reheated in a heat exchanger 107 and passed through a catalytic converter 108. The resulting sulphur trioxide gases are cooled in a $SO_3$ cooler 109 and passed through absorbers 110, 111 and 112 for the recovery of their $SO_3$ content as sulphuric acid monohydrate and oleum.

Approximately 355 tons of 93% sulphuric acid from the concentrators 100, corresponding to 330 tons of sulphuric acid, are utilized as feed acid for the 98% $H_2SO_4$ absorbing tower, and sulphuric acid monohydrate from this tower is passed in series through towers 111 and 110 in countercurrent flow to the flow of the $SO_3$ gases. The final product from the plant is thus obtained as 109% sulphuric acid (oleum) in a quantity sufficient to make up for all mechanical losses and entrainment in the nitration plant, the denitrating plant and the concentrators 100, and thus the entire sulphuric acid requirements of the nitration plant are supplied.

What I claim is:

1. A method of regenerating relatively concentrated sulphuric acid which comprises injecting said acid in finely divided condition into a combustion zone while simultaneously introducing air and fuel into said zone in amounts such as to maintain oxidizing conditions and a temperature of at least 1600° F. therein and free oxygen in the products of combustion, but less than quantities which would dilute the products of combustion to an $SO_2$ content at which the catalytic air oxidation of $SO_2$ to $SO_3$ is not self-sustaining, heating the acid in said zone until its thermal decomposition is substantially complete, catalytically oxidizing the sulphur dioxide in the resulting gases by the contact sulphuric acid process, and absorbing the resulting sulphur trioxide in concentrated sulphuric acid.

2. A method of regenerating relatively concentrated sulphuric acid which comprises injecting said acid in finely divided condition into a combustion zone while simultaneously introducing air and a fuel selected from the group consisting of hydrocarbon and sulphur fuels in amounts such as to maintain oxidizing conditions and a temperature of at least 1600° F. therein and free oxygen in the products of combustion, but less than quantities which would dilute the products of combustion to an $SO_2$ content at which the catalytic air oxidation of $SO_2$ to $SO_3$ is not self-sustaining, heating the acid in said combustion zone until its thermal decomposition is substantially complete, catalytically oxidizing the sulphur dioxide in the resulting gases by the contact sulphuric acid process, and absorbing the resulting sulphur trioxide in concentrated sulphuric acid.

3. A method of regenerating relatively concentrated sulphuric acid which comprises injecting said acid in finely divided condition into a combustion zone while simultaneously introducing air and fuel into said zone in amounts such as to maintain oxidizing conditions and a temperature of at least 1600° F. therein and free oxygen in the products of combustion, but less than quantities which would dilute the products of combustion to an $SO_2$ content at which the catalytic air oxidation of $SO_2$ to $SO_3$ is not self-sustaining, heating the acid in said zone until its thermal decomposition is substantially complete, preheating at least a part of said air on its way to said combustion zone by passing it in heat exchange relation with the combustion gases leaving said zone, catalytically oxidizing the sulphur dioxide in the combustion gases by the contact sulphuric acid process, and absorbing the resulting sulphur trioxide in concentrated sulphuric acid.

4. A process according to claim 3 in which the air is preheated to at least 800° F.

5. A regeneration method for weak sulphuric acid which comprises concentrating said weak acid to concentrated acid of 80–96% $H_2SO_4$ content, subjecting a part of the concentrated acid to thermal decomposition by injecting it in finely divided condition into a combustion zone while simultaneously introducing air and fuel into said zone in amounts such as to maintain oxidizing conditions and a temperature of at least 1600° F. therein and free oxygen in the products of combustion, but less than quantities which would dilute the products of combustion to an $SO_2$ content at which the catalytic air oxidation of $SO_2$ to $SO_3$ is not self-sustaining, heating the acid in said zone until its thermal decomposition is substantially complete, catalytically oxidizing the sulphur dioxide in the resulting gases by the contact sulphuric acid process, and absorbing the resulting sulphur trioxide in the remainder of the concentrated acid.

6. A method of regenerating relatively concentrated sulphuric acid which comprises injecting said acid in finely divided condition into a combustion zone while simultaneously introducing air and fuel into said zone in amounts sufficient to maintain oxidizing conditions and a temperature of at least 1600° F., to obtain a gaseous mixture containing $SO_2$ and oxygen in amounts suitable for catalytic oxidation to form $SO_3$ without further addition of $SO_2$, catalytically oxidizing the $SO_2$ to $SO_3$ without such further addition, and recovering $SO_3$ as concentrated sulphuric acid.

NICOLAY TITLESTAD.